US012702948B2

(12) United States Patent
Low et al.

(10) Patent No.: US 12,702,948 B2
(45) Date of Patent: Aug. 11, 2026

(54) METHOD FOR THE SEPARATION OF PHOSPHORUS PENTAFLUORIDE FROM HYDROGEN CHLORIDE

(71) Applicant: MEXICHEM FLUOR S.A. DE C.V., San Luis Potosi (MX)

(72) Inventors: Robert E. Low, Runcorn (GB); Andrew P. Sharratt, Runcorn (GB)

(73) Assignee: MEXICHEM FLUOR S.A. DE C.V., San Luis Potosi (MX)

( * ) Notice: Subject to any disclaimer, the term of this patent is extended or adjusted under 35 U.S.C. 154(b) by 296 days.

(21) Appl. No.: 18/580,258

(22) PCT Filed: Jun. 22, 2022

(86) PCT No.: PCT/GB2022/051585

§ 371 (c)(1),
(2) Date: Jan. 18, 2024

(87) PCT Pub. No.: WO2023/002146

PCT Pub. Date: Jan. 26, 2023

(65) Prior Publication Data

US 2025/0065259 A1 Feb. 27, 2025

(30) Foreign Application Priority Data

Jul. 23, 2021 (GB) ..................................... 2110642

(51) Int. Cl.

| | |
|---|---|
| ***B01D 69/10*** | (2006.01) |
| ***B01D 53/22*** | (2006.01) |
| ***B01D 71/64*** | (2006.01) |
| ***B01D 71/70*** | (2006.01) |
| ***C01B 7/07*** | (2006.01) |
| ***C01B 25/10*** | (2006.01) |

(52) U.S. Cl.

CPC ........... *B01D 53/228* (2013.01); *B01D 71/64* (2013.01); *B01D 71/701* (2022.08); *B01D 2256/26* (2013.01); *B01D 2257/2045* (2013.01)

(58) Field of Classification Search

CPC .... B01D 53/228; B01D 53/22; B01D 53/221; B01D 53/222; B01D 53/223; B01D 53/224; B01D 53/225; B01D 53/226; B01D 53/227; B01D 53/229; B01D 71/64; B01D 71/701; B01D 2256/26; B01D 2257/2045; B01D 71/32; B01D 71/70; C01B 7/0737; C01B 25/10

USPC ................................. 96/7–14; 95/43, 45, 48

See application file for complete search history.

(56) References Cited

U.S. PATENT DOCUMENTS

| | | | |
|---|---|---|---|
| 11,628,394 B2 | 4/2023 | Kurishita et al. | |
| 2009/0211449 A1* | 8/2009 | Olschimke | C01B 7/0731 95/233 |
| 2009/0242840 A1 | 10/2009 | Olschimke et al. | |
| 2012/0003138 A1 | 1/2012 | Hulse et al. | |
| 2016/0244331 A1 | 8/2016 | Saito et al. | |
| 2020/0295404 A1* | 9/2020 | Woo | H01M 10/0568 |
| 2021/0283550 A1 | 9/2021 | Kurishita et al. | |

FOREIGN PATENT DOCUMENTS

| | | |
|---|---|---|
| CN | 1886337 A | 12/2006 |
| CN | 102515132 A | 6/2012 |
| CN | 106621443 A | 5/2017 |
| CN | 109475810 A | 3/2019 |
| WO | WO 2005/061381 A1 | 7/2005 |
| WO | WO 2007/125065 A1 | 11/2007 |
| WO | WO 2018/030356 A1 | 8/2017 |

OTHER PUBLICATIONS

International Search Report for corresponding PCT Application No. PCT/GB2022/051585 mailed Oct. 17, 2022, 4 pgs.

Written Opinion of the International Searching Authority for corresponding PCT Application No. PCT/GB2022/051585 mailed Oct. 17, 2022, 6 pgs.

Office Action issued in Chinese Application No. 202280049864.5 dated Feb. 14, 2026 with English translation (7 pages).

Office Action issued in Taiwanese Application No. 111124638 dated Nov. 5, 2025 with English translation (3 pages).

Chen, Qi-Guo; "Research progress of the application of membrane separation technology in HCl-containing system", China Academic Journal electronic Publishing House, Jan. 2020, pp. 43-47, No. 1 (English Abstract only) (7 pages).

Search Report issued in Chinese Application No. 2022800498645 dated Feb. 14, 2026 (1 page).

* cited by examiner

*Primary Examiner* — Frank M Lawrence, Jr.
(74) *Attorney, Agent, or Firm* — Crowell & Moring LLP

(57) ABSTRACT

The present invention relates to a process of separating a feed stream comprising HCl and $PF_5$ into a plurality of streams, wherein a first stream is enriched in $PF_5$ and a second stream is enriched in HCl, the process comprising the feed stream entering one or more permeable membrane separation modules, wherein the membrane separation module comprises a permeable membrane which is selectively permeable to one of HCl or $PF_5$.

25 Claims, No Drawings

METHOD FOR THE SEPARATION OF PHOSPHORUS PENTAFLUORIDE FROM HYDROGEN CHLORIDE

CROSS-REFERENCE TO RELATED APPLICATIONS

This application is the U.S. National Stage application of PCT application no. PCT/GB2022/051585, filed on Jun. 22, 2022, titled METHOD FOR THE SEPARATION OF PHOSPHORUS PENTAFLUORIDE FROM HYDROGEN CHLORIDE, designating the United States, which claims priority to Great Britain application no. 2110642.2, filed on Jul. 23, 2021, the contents of which are each incorporated herein by reference in their entirety.

FIELD OF THE INVENTION

The present invention relates to a method for the separation of phosphorous pentafluoride from hydrogen chloride in a gaseous mixture. This separation method is particularly useful in the production of lithium hexafluorophosphate.

BACKGROUND OF THE INVENTION

Lithium hexafluorophosphate ($LiPF_6$) is used in batteries, such as commercial secondary batteries, an application that exploits its high solubility in non-aqueous, polar solvents.

Lithium hexafluorophosphate may be produced from the reaction between phosphorus pentafluoride ($PF_5$) and lithium fluoride. The resultant lithium hexafluorophosphate may then isolated by precipitating lithium hexafluorophosphate crystals from a solution.

Phosphorous pentafluoride is extremely difficult to handle owing to its toxicity and cannot be transported and/or purchased. Therefore, when lithium hexafluorophosphate is generated by this method, the phosphorous pentafluoride must be generated in situ. Accordingly, the process for producing lithium hexafluorophosphate generally involves a reaction between a phosphorous containing species such as phosphorous pentachloride or phosphorus trichloride and hydrogen fluoride to obtain phosphorous pentafluoride.

The reaction to obtain phosphorous pentafluoride also results in the formation of hydrogen chloride (HCl). Accordingly, the reaction to obtain phosphorous pentafluoride results in a crude product stream of pressurised gas comprising phosphorous pentafluoride together with hydrogen chloride. The molar ratio of hydrogen chloride to phosphorous pentafluoride in this crude product stream is approximately 5:1. Therefore, in order to produce a lithium fluoride product that does not comprise large amounts of hydrogen chloride, the hydrogen chloride must be removed using a tailored solvent system.

Typically such solvent systems involve passing the crude product stream through a counter-current flow absorption tower wherein it is contacted with a liquid solvent stream containing dissolved lithium fluoride. The solvent must then be disposed of, which can be difficult due to the presence of toxic phosphorous pentafluoride in the solvent, whether in trace quantities or greater.

The phosphorous pentafluoride is subsequently absorbed into the liquid phase where it undergoes a reaction with the lithium fluoride to form lithium hexafluorophosphate. The hydrogen chloride gas passes through the tower and is ultimately vented for further processing. Since the hydrogen chloride is in large molar excess it does however dissolve in the solvent to some extent, meaning the solvent stream must be further processed to remove hydrogen chloride before the lithium hexafluorophosphate may be recovered.

A further adverse consequence of this contacting method is that the overall volumetric flow of gas is about six times the volumetric flow of the phosphorous pentafluoride alone. This means that the size of equipment (diameter and height) must be greater, and the liquid solvent inventory must be greater, than if a stream of pure (or substantially enriched) phosphorous pentafluoride gas were available for contacting with the lithium fluoride solution. The solvents suitable for use in this process are themselves often hazardous chemicals (HF being one example) so it is desirable to reduce equipment size as much as possible to improve intrinsic safety of the process and reduce operating costs.

It is not possible to separate phosphorous pentafluoride and HCl by simple distillation. Their normal boiling points are less than 1 Kelvin apart and their vapour pressures are equal at a temperature of about 4° C. This consequently means that phosphorous pentafluoride and HCl form an azeotropic mixture. The binary azeotropic composition is at an HCl composition of about 54 mol. % and has been found by the inventors to be almost invariant in the temperature range −65° C. to +5° C. This means that it is not possible to separate the azeotrope by temperature or pressure swing distillation.

While it may be possible to separate this mixture using an entrainer solvent, this approach brings significant additional cost and complexity to the distillation sequence and introduces another chemical to the process.

In production of organic fluorochemicals (such as refrigerant gases) It is common to separate HCl from the desired fluorinated product species by absorption of the HCl into water. This is not however possible for this mixture as contact with water will destroy the phosphorous pentafluoride, converting it to a mixture of phosphoryl fluoride ($POF_3$) gas, aqueous HF and aqueous phosphoric acid.

What is desired therefore is a method for separating phosphorous pentafluoride and HCl out of a pressurised gas stream comprising these two species, in an approximate molar ratio of 5:1 ($HCl:PF_5$) without introducing additional process chemicals and in a manner that yields a high purity phosphorous pentafluoride stream and preferably also an HCl stream of sufficient purity for It to be saleable as a by-product. Preferably the phosphorous pentafluoride stream is sufficiently enriched that it may be used in lithium hexafluorophosphate synthesis without further processing. The present invention provides such a process.

STATEMENT OF THE INVENTION

The inventors have surprisingly found that it is possible to separate $PF_5$ and HCl by use of a membrane separation process. Specifically the inventors have found that a membrane separation process may be used to separate azeotropic or near-azeotropic compositions comprising $PF_5$ and HCl.

Without wishing to be bound by theory, the existence of an azeotropic or near-azeotropic composition is generally dependent on temperature, pressure and the ratio of components in the composition.

By azeotrope or azeotropic composition, we mean a preferably binary composition which at vapour-liquid equilibrium has substantially the same composition in both the liquid and vapour phase, and whose boiling point is higher or lower than that of either of the pure components. A high boiling azeotrope is an azeotrope which has a higher boiling point than its pure components. A low boiling azeotrope is an azeotrope which has a boiling point lower than its pure components.

By near-azeotrope or near-azeotropic composition (e.g. a near-azeotropic composition of $PF_5$ and HCl), we mean a composition that behaves similarly to an azeotrope composition (i.e. the composition has constant boiling characteristics or a tendency not to fractionate upon boiling), but may not have all of the properties of an azeotrope, for example binary liquid compositions whose vapour pressure is above that of the pure component with the lower boiling point (e.g. HCl compared to $PF_5$) when measured at equivalent temperature, but whose equilibrium vapour composition may differ from the liquid composition.

In essence, at a given pressure, an azeotrope or near azeotrope composition has substantially the same constituent proportions in the vapour phase as in the boiling liquid phase. This means that no (or substantially no) fractionation of the components in the liquid composition takes place.

The present invention provides a process for separating a feed stream (e.g., feed gas stream) comprising HCl and $PF_5$ into a plurality of streams, wherein a first stream is enriched in $PF_5$ and a second stream is enriched in HCl, the process comprising the feed stream entering one or more permeable membrane separation modules, wherein the permeable membrane separation module comprises a membrane which is selectively permeable to one of HCl or $PF_5$.

The present invention advantageously allows for purified $PF_5$ to be yielded as a main product along with purified HCl being yielded as a valuable side product. Advantageously, this is achieved by without introducing additional process chemicals.

A further advantage of the present invention is that one of the product streams may be sufficiently enriched in $PF_5$ so that said product stream may be used in lithium hexafluorophosphate synthesis without the need for further processing.

The absence of the need for additional solvents, such as entrainer solvents, to separate the $PF_5$ and HCl means that the process of the present invention advantageously reduces the costs and complexity when compared to processes known in the prior art.

DESCRIPTION OF THE INVENTION

In a first aspect, the present invention provides a process for separating a feed stream comprising HCl and $PF_5$ into a plurality of streams, wherein a first stream is enriched in $PF_5$ and a second stream is enriched in HCl, the process comprising the feed stream entering one or more permeable membrane separation modules, wherein the permeable membrane separation module comprises a membrane which is selectively permeable to one of HCl or $PF_5$.

In preferred embodiments the phase to be separated is gaseous and the resulting product streams are also gaseous on leaving the separation module.

In some embodiments, the feed stream may be separated into only two streams with the first stream being enriched in $PF_5$ and the second stream being enriched in HCl.

In some preferred embodiments, the feed stream may be in the vapour phase and may comprise HCl:$PF_5$ in a molar ratio of greater than 1:1 up to about 15:1, preferably in a molar ratio of greater than 1:1 up to about 10:1, more preferably in a molar ratio of greater than 1:1 up to about 5:1.

By a stream being enriched in a certain compound we mean that the composition of the product stream contains a higher molar percentage of said product that the feed stream.

For example, the separation process of the present invention may increase the concentration of $PF_5$ from about 16 mol. % in HCl in the feed stream to a concentration of greater than 50 mol. %.

In some embodiments, the process of the present invention may further comprise a step of purifying the first stream and/or second stream so as to produce a purified stream and a waste stream, wherein the purified stream comprises $PF_5$ and/or HCl in an increased impurity compared to the first and/or second stream, respectively.

In some embodiments, the process of the present invention further comprises a step of purifying the first stream and/or second stream so as to produce a purified stream and a waste stream, wherein the purified stream comprises $PF_5$ and/or HCl in an increased impurity compared to the first and/or second stream, respectively.

In some embodiments, the first stream is enriched with $PF_5$ so that the molar ratio of $PF_5$:HCl is at least 1:1, preferably 2:1, more preferably 5:1, most preferably 10:1.

When the first stream is enriched with $PF_5$ so that the molar ratio of $PF_5$:HCl is at least 1:1 the first stream is considered to be sufficiently enriched so that the first stream may be used in $LIPF_6$ synthesis without further processing (e.g., further purification).

In some embodiments when the first stream is enriched with $PF_5$ so that the molar ratio of $PF_5$:HCl is at least 1:1 the purification step may be carried out by distillation.

Achieving an enriched stream with greater than 50 mol. % $PF_5$ allows the distillation of the enriched stream to yield a bottom product of high purity $PF_5$ and a top product of mixed gas at or near the azeotropic concentration of 46% molar $PF_5$.

After distillation, the purity of $PF_5$ in the purified stream is at least 90 mol % $PF_5$, more preferably 95 mol. % $PF_5$, even more preferably 97 mol. % $PF_5$, even more preferably 99 mol. % $PF_5$.

Advantageously, the purified stream comprises at least 50 mol. % $PF_5$ when used in $LIPF_6$ synthesis.

A further example of a described separation process falling within the scope of the claims may be one in which an initial separation step generates a partially enriched stream whose composition is greater than 46% molar $PF_5$ (advantageously greater than 50% $PF_5$), followed by a distillative separation of the partially enriched stream to give a stream at the desired purity of $PF_5$ (for example, 90 mol % $PF_5$, more preferably 95 mol. % $PF_5$, even more preferably 97 mol. % $PF_5$, even more preferably 99 mol. % $PF_5$).

In some embodiments, the process of the present invention further comprises a step of recycling the waste stream back into the one or more membrane separation modules. In such a process the waste stream comprises an azeotropic or near-azeotropic mixture of $PF_5$ and HCl. The waste stream comprises the remainder of the material fed into the distillation step that does not exit the distillation phase as the purified stream. The waste stream is fed back to the one or more permeable membrane separation modules, preferably the first or the primary permeable membrane separation module. Accordingly, the composition of the waste stream goes through the separation process again.

In some embodiments, the first stream and/or the second stream may be passed through a further permeable membrane separation module in order to further enrich the amount of $PF_5$ or HCl in the first or second stream respectively, before the purification step.

For the avoidance of doubt, the term permeable membrane takes the conventional definition known in the art. Namely, permeable membranes relate to membranes with allow a permeating fluid to diffuse through the membrane material as a consequence of the pressure difference over the membrane. The skilled person will appreciate that such membranes may be selective (i.e., have higher permeation rates) towards certain fluid. Factors which affect the selectivity of a membrane include, but are not limited to, the size of the pores of the membrane, the size of the molecules, the diffusivity of the molecules and the solubility of the permeate in the membrane.

Without wishing to be bound by theory, the membrane separation process relies on permeation of fluids at different rates through a membrane from a region of higher pressure to a region of lower pressure. The pressure gradient may be controlled by creating a lower pressure environment one side of the membrane within the membrane separation module by using, for example, a vacuum pump or other device. The lower pressure may therefore be created by removing fluid as it is passed through the membrane.

The higher pressure side of the membrane within the membrane separation module is fed with fluid so as to maintain the higher pressure at or close to the supply pressure.

Alternatively, or additionally, an intermediate booster compressor may be used to elevate the feed fluid pressure prior to its admission to the separation module.

Preferred processes of this invention are those wherein the feed and product fluids entering the permeation module are in the gaseous or vapour state.

A single (e.g., primary) membrane separation module may be used in the process of the claimed invention. In this case, one method of operation may be to increase the amount of $PF_5$ in the retentate so that the amount of $PF_5$ moves to be greater than the amount of $PF_5$ present in the $PF_5$/HCl azeotrope composition. Both of the retentate and permeate streams may then be further purified to yield $PF_5$ and HCl streams of desired purity, with unwanted material from each distillation stage being boosted in pressure and returned as recycle to an inlet of the membrane separation module.

Additional membrane separation units may be employed (e.g., one, two, three, four, five, or more additional membrane separation modules may be used) on either stream (i.e., the retentate or permeate stream) arising from the primary membrane separation module as desired to further enrich the $PF_5$ or HCl as needed before distillation is carried out When more than one membrane separation module is used, the membrane separation units may be connected in series. The waste streams resulting from the process at each membrane separation module may also be cojoined so as to form a single waste stream that is recycled back into the primary membrane separation module.

In one embodiment of the present invention the membrane found in the permeable membrane separation module is a microporous, inert polymeric material.

As used herein, the term microporous material means a material containing pores with diameters less than 2 nm.

In some embodiments the microporous, inert polymeric material is selected from the group consisting of poly tetrafluoroethene (PTFE), polyvinylidene fluoride (PVDF), fluorinated ethylene-propylene (FEP), sulfonated perfluorovinyl ether-tetrafluoroethene copolymers (e.g., Nafion™) or a combination thereof. Naflon™ means polymer materials sold under the Naflon trademark by the Chemours Corporation.

In embodiments where the permeable membrane separation module is a microporous, inert polymeric material, the pressure gradient across said membrane in the one or more permeable membrane separation modules is from about 0.1 bar to about 20 bar, preferably from about 0.25 bar to about 15 bar, more preferably from about 0.5 bar to about 10 bar.

In embodiments where the permeable membrane separation module is a microporous, inert polymeric material, the process is carried out in the relevant one or more permeable membrane separation modules at a temperature of from about −50° C. to about 80° C., preferably from about −30° C. to about 50° C., more preferably from about −20° C. to about 40° C.

Alternatively, in other embodiments, the membrane material may be selected from a rubbery or glassy polymeric material.

As used herein, glassy polymers relate to polymers which have a glass transition temperature (Tg) greater than room temperature.

As used herein, rubbery polymers relate to polymers which have a glass transition temperature (Tg) below than room temperature.

In these embodiments the solubility of one of $PF_5$ or HCl is enhanced relative to the other component so that the component with a higher solubility permeates through the membrane at a faster rate than the component with a lower solubility.

In some relevant embodiments, the membrane material may be selected from the group consisting of fluorinated polymers, polyvinyl chloride, polysiloxanes, poly-methylpentene, polysulfones, polyimides, partially fluorinated or substituted polyimides, or a combination thereof.

In some embodiments, preferably the polysiloxane is poly dimethyl siloxane.

In some embodiments, preferably the polyimide is a fluorinated polyimide, preferably 6FDA-6FpDA. For the avoidance of doubt, 6FDA-6FpDA has the following structure:

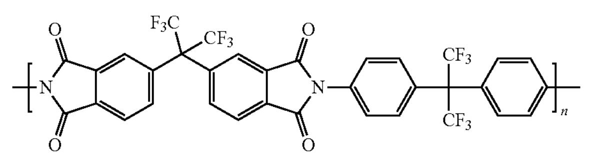

The Hildebrand solubility parameter (6) provides a numerical estimate of the degree of interaction between materials and can be a good indication of solubility, particularly P for nonpolar materials such as many polymers. In other words, the Hildebrand solubility parameter provides a measure of the affinity of a solvent for a solute.

If the value of the Hildebrand solubility parameter is similar for a solvent (e.g., the membrane) and solute (e.g., the relevant molecules) then a reasonable degree of solvency of solute in the bulk material may be anticipated.

For example, the Hildebrand parameter for HCl is about 21 $(MPa)^{1/2}$ in the temperature range −60° C. to +20° C. and the Hildebrand parameter for $PF_5$ is about 11 $(MPa)^{1/2}$ in the temperature range −60° C. to +20° C. The fluorinated polyimide 6FDA-6FpDA has a Hildebrand parameter of about 21 $(MPa)^{1/2}$ and so it may be anticipated that HCl will exhibit high solubility in 6FDA-6FpDA. The solubility parameter for PTFE is about 13$(MPa)^{1/2}$ and the solubility parameter of PDMS is about 16 $(MPa)^{1/2}$ so it may be anticipated that the solubility of $PF_5$ in these materials may be higher than the solubility of HCl.

If a separation process is desired in which $PF_5$ is enriched in the permeate stream then the membrane may be selected so that $PF_5$ has a higher preferential solubility in the material than does HCl. Therefore, the membrane may be made of a material which has Hildebrand parameter of the membrane is closer in value to that of $PF_5$ (e.g., 11 $(MPa)^{1/2}$ in the temperature range −60° C. to +20° C.) compared to that of HCl (21 $(MPa)^{1/2}$ in the temperature range −60° C. to +20° C.).

Alternatively, if a separation process is desired in which HCl is enriched in the permeate stream then the membrane may be selected so that HCl has a higher preferential solubility in the material than does $PF_5$.

In embodiments where the permeable membrane separation module is a rubbery or glassy polymeric material, the pressure gradient across said membrane in the one or more permeable membrane separation modules is from about 0.1 bar to about 20 bar, preferably from about 0.25 bar to about 15 bar, more preferably from about 0.25 bar to about 10 bar.

In embodiments where the permeable membrane separation module is a rubbery or glassy polymeric material, the process is carried out in the relevant one or more permeable membrane separation modules at a temperature of from about −80° C. to about 120° C., preferably from about −60° C. to about 80° C., more preferably from about −40° C. to about 40° C.

In any of the above embodiments, the membrane may be a flat sheet membrane. Alternatively, the membrane may be a hollow fiber membrane.

Hollow-fiber membrane systems are those where the membrane has been formed into small-diameter hollow tubes. Assemblies of these hollow tubes are conventionally made with bundles of these tubes encased inside a pressure-tight tubular shell fitted with gas-tight header plates so that the assembly resembles a shell-and-tube heat exchanger. The direction of permeation may be either from inside the hollow fibers to the shell, or the other way round.

Flat sheet membranes are typically formed of the separation membrane itself bonded to one or more inert support membrane materials, whose pores do not represent a significant impediment to separation. These are conventionally wound in a spiral pattern around spacer materials then the whole assembly is placed inside a pressure-tight cylindrical shell. The annular arrangement means that the internal space is divided into a high pressure and low pressure region and so fluid may be contacted with a large surface area in a compact overall enclosure size.

The invention claimed is:

1. A process of separating a feed stream comprising HCl and $PF_5$ into a plurality of streams, wherein a first stream is enriched in $PF_5$ and a second stream is enriched in HCl, the process comprising the feed stream entering one or more permeable membrane separation modules, wherein the membrane separation module comprises a permeable membrane which is selectively permeable to one of HCl or $PF_5$.

2. The process according to claim 1 wherein the feed stream is separated into two streams: (i) the first stream enriched in $PF_5$; and (ii) the second stream enriched in HCl.

3. The process according to claim 1 wherein the feed stream comprises HCl:$PF_5$ in a molar ratio of greater than 1:1 up to about 15:1, or in a molar ratio of greater than 1:1 up to about 10:1, or in a molar ratio of greater than 1:1 up to about 5:1.

4. The process according to claim 1, wherein the process further comprises a step of purifying the first stream and/or second stream so as to produce a purified stream and a waste stream, wherein the purified stream comprises $PF_5$ and/or HCl in an increased impurity compared to the first and/or second stream, respectively.

5. The process according to claim 1, wherein the first stream is enriched with $PF_5$ so that the molar ratio of $PF_5$:HCl is at least 1:1, at least 2:1, at least 5:1, or at least 10:1.

6. The process according to claim 4 wherein when the first stream is enriched with $PF_5$ so that the molar ratio of $PF_5$:HCl is at least 1:1, the purification step is carried out by distillation.

7. The process according to claim 4 wherein the process further comprises a step of recycling the waste stream back into the one or more membrane separation modules.

8. The process according to claim 4, wherein the first stream and/or the second stream is passed through a further permeable membrane separation module in order to further enrich the amount of $PF_5$ or HCl in the first or second stream respectively, before the purification step.

9. The process according to claim 1 wherein the membrane is a microporous, inert polymeric material.

10. The process according to claim 9 wherein the microporous, inert polymeric material is selected from the group consisting of poly tetrafluoroethene (PTFE), polyvinylidene fluoride (PVDF), fluorinated ethylene-propylene (FEP), sulfonated perfluorovinyl ether-tetrafluoroethene copolymers or a combination thereof.

11. The process according to claim 9 wherein a pressure gradient across the membrane in one or more of the permeable membrane separation modules is from about 0.1 bar to about 20 bar, from about 0.25 bar to about 15 bar, or from about 0.5 bar to about 10 bar.

12. The process according to claim 9 wherein the process is carried out in one or more of the permeable membrane separation modules at a temperature of from about −50° C. to about 80° C., from about −30° C. to about 50° C., or from about −20° C. to about 40° C.

13. The process according to claim 1 wherein the membrane material is selected from a rubbery or glassy polymeric material wherein the solubility of one of $PF_5$ or HCl is enhanced relative to the other component so that the component with a higher solubility permeates through the membrane at a faster rate than the component with a lower solubility.

14. The process according to claim 13 wherein the membrane material is selected from the group consisting of fluorinated polymers, polyvinyl chloride, polysiloxanes, poly-methyl-pentene, polysulfones, polyimides, partially fluorinated or substituted polyimides, or a combination thereof.

15. The process according to claim 14 wherein the polysiloxane is poly dimethyl siloxane.

16. The process according to claim 14 wherein the polyimide is a fluorinated polyimide, or is 6FDA-6FpDA.

17. The process according to claim 13 wherein a pressure gradient across the membrane in one or more of the permeable membrane separation modules is from about 0.1 bar to about 20 bar, preferably from about 0.25 bar to about 15 bar, or from about 0.25 bar to about 10 bar.

18. The process according to claim 13 wherein the process is carried out in one or more of the permeable membrane separation modules at a temperature of from about −80° C. to about 120° C., from about −60° C. to about 80° C., or from about −40° C. to about 40° C.

19. The process according to claim 13 wherein the membrane is made of a material which has a Hildebrand solubility parameter closer in value to that of HCl (21 $(MPa)^{1/2}$ in the temperature range −60° C. to +20° C.) compared to that of $PF_5$ (11 $(MPa)^{1/2}$ in the temperature range −60° C. to +20° C.).

20. The process according to claim 13 wherein the membrane is made of a material which has a Hildebrand parameter closer in value to that of $PF_5$ (11 $(MPa)^{1/2}$ in the temperature range −60° C. to +20° C.) compared to that of HCl (21 $(MPa)^{1/2}$ in the temperature range −60° C. to +20° C.).

21. The process according to claim 1 wherein the membrane is a flat sheet membrane.

22. The process according to claim 1 wherein the membrane is a hollow fiber membrane.

23. The process according to claim 1 wherein the process is carried out in a batchwise or continuous operation.

24. The process according to claim 1 wherein the one or more streams entering the membrane separation module is in the gaseous or vapour state.

25. The process according to claim 5 wherein the $PF_5$ produced in this process is used in a process to synthesis $LiPF_6$.

* * * * *